(12) United States Patent
Alexander et al.

(10) Patent No.: US 7,111,099 B2
(45) Date of Patent: Sep. 19, 2006

(54) INFORMATION HANDLING SYSTEM WITH IMPROVED BUS SYSTEM

(75) Inventors: Marc D. Alexander, Cedar Park, TX (US); Todd Martin, Austin, TX (US); Matthew B. Mendelow, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 10/199,076

(22) Filed: Jul. 19, 2002

(65) Prior Publication Data

US 2004/0015634 A1 Jan. 22, 2004

(51) Int. Cl.
*G06F 13/00* (2006.01)

(52) U.S. Cl. .................. 710/300; 710/301; 710/313

(58) Field of Classification Search ............. 710/305, 710/306, 313–316, 8, 62, 72; 714/25
See application file for complete search history.

(56) References Cited

U.S. PATENT DOCUMENTS

| 4,677,548 | A | | 6/1987 | Bradley |
| 5,327,172 | A | * | 7/1994 | Tan et al. ................ 348/378 |
| 6,237,048 | B1 | * | 5/2001 | Allen et al. ................ 710/8 |
| 6,735,660 | B1 | * | 5/2004 | Osten et al. ............... 710/305 |

OTHER PUBLICATIONS

Link, Plug and Play, Solving Resource Allocation Puzzles, Dec. 2001.*
PCI Local Bus Specification; Revision 2.2; Dec. 18, 1998.
PCI Local Bus Specification; Revision 2.3; Oct. 31, 2001.

* cited by examiner

*Primary Examiner*—Khanh Dang
(74) *Attorney, Agent, or Firm*—Baker Botts L.L.P.

(57) ABSTRACT

An information handling system comprises a first bus system comprising a plurality of connection pins wherein at least one pin is unused, at least one control line for controlling or communication with devices of the system, a controllable coupling/de-coupling unit for coupling/de-coupling the control line with the at least one previously unused pin, and a control unit for controlling the coupling/de-coupling unit coupled with the control line.

11 Claims, 4 Drawing Sheets

INFORMATION HANDLING SYSTEM WITH IMPROVED BUS SYSTEM

FIELD OF THE INVENTION

The present invention relates to an information handling system, including a bus system for coupling a plurality of peripheral devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as, personal computers, servers, laptop computer with docking stations, and other computer systems having a bus system for adapter cards are well known in the art. These computer systems typically include a CPU coupled with a plurality of on board devices, such as, a clock system, a timer unit, a plurality of memory modules, etc. Usually dedicated internal bus structures are used to exchange data between these modules and the CPU. Other logic is provided to couple the CPU with a high bandwidth local expansion bus, such as the peripheral component interconnect (PCI) bus or the VESA (Video Electronics Standards Association) VL bus. These standardized bus systems comprise usually a number of slots wherein each of the slots is capable of receiving an extension card. Each extension card can comprise a plurality or a single peripheral device, such as, a video card, serial and/or parallel interfaces, high speed communication interfaces, etc. To this end, each slot provides a plurality of connection pins. Communication between a bus system and other peripherals or the CPU is usually limited to the defined hardware and the respective protocols specified for the specific bus system. However, there is often a need for communication between certain peripheral devices which could be handled by a different bus system not available to the standardized slot system.

SUMMARY OF THE INVENTION

Therefore, a need for an improved computer system having a slot based bus architecture which overcomes the above mentioned problems exists.

A first embodiment of the present invention is an information handling system comprising a first bus system comprising a plurality of connection pins wherein at least one pin is unused, at least one control line for controlling or communication with devices of the system, a controllable coupling/de-coupling unit for coupling/de-coupling the control line with the at least one previously unused pin, and a control unit for controlling the coupling/de-coupling unit coupled with the control line.

Another embodiment concerns an information handling system comprising a first bus system comprising a first and second set of connection pins, a bridge unit coupled with a first set of connection pins, at least one control line for controlling or communication with devices of the system, a controllable coupling/de-coupling unit for coupling/de-coupling the control line with the at least one pin of the second set of connection pins, and a control unit for controlling the coupling/de-coupling unit coupled with the control line.

The first bus system may be a PCI bus which comprises two previously unused pins and two control lines are used to form a SMBus. The unused pins may, thus, be connected in an improved version of the specified bus. The first bus system may also comprise a plurality of slots. The control line of each slot can be coupled with the controllable coupling/de-coupling unit. For each slot there may be provided a controllable coupling/de-coupling unit and each control line can be coupled with the respective coupling/de-coupling unit. The coupling/de-coupling unit can comprise a controllable bi-directional driver. Furthermore, the coupling/de-coupling unit may be a controllable switch. The control unit may comprise sensing means for detecting the status of the control line.

A method according to the present invention of operating an information handling system comprising a first bus system comprising a plurality of connection pins including at least one previously unused connection pin and at least one control line independent from the first bus system, comprises the steps of:
  coupling the previously unused pin with the control line;
  testing the control line;
  if the control line is not functional, de-coupling the control line from the first bus system.

Another method according to the present invention of operating an information handling system comprising a first bus system comprising a first and second set of connection pins, a bridge unit coupled with the first set of connection pins and at least one control line independent from the first bus system, comprises the steps of:
  coupling at least one pin of the second set of connection pins with the control line;
  testing the control line;
  if the control line is not functional, de-coupling the control line from the first bus system.

The first bus system is a PCI bus including a plurality of coupling slots and the control line may be a communication line of a SMBus. The method may further comprise the steps of individually coupling the previously unused pin of each slot with the control line and individually de-coupling the control line from each slot if the control line is not functional when coupled with the respective slot. The method may also comprise the step of setting or clearing a flag depending on the coupling status of the control line. The method may be an integral part of the basic input output system.

Yet another method of operating an information handling system comprising a first bus system having a plurality of slots, wherein each slot comprises a plurality of connection pins including at least one previously unused connection pin and at least one control line independent from the first bus system, comprises the steps of:
  a) coupling the previously unused pin of the first slot with the control line;
  b) testing the control line;
  c) if the control line is not functional, de-coupling the control line from the first slot of the first bus system; and
  d) repeating steps a)–c) for all slots.

Yet another method of operating an information handling system comprising a first bus system having a plurality of slots, wherein each slot comprises a first and second set of connection pins, a bridge unit coupled with the first set of connection pins and at least one control line independent from the first bus system, comprises the steps of:
  a) coupling at least one pin from the first set of connection pins of the first slot with the control line;
  b) testing the control line;
  c) if the control line is not functional, de-coupling the control line from the first slot of the first bus system; and
  d) repeating steps a)–c) for all slots.

Again, the first bus system may be a PCI bus and the control line may be a communication line of a SMBus. The method may further comprise the step of setting or clearing a flag depending on the coupling status of the control line. Furthermore, the method may be an integral part of the basic input output system.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
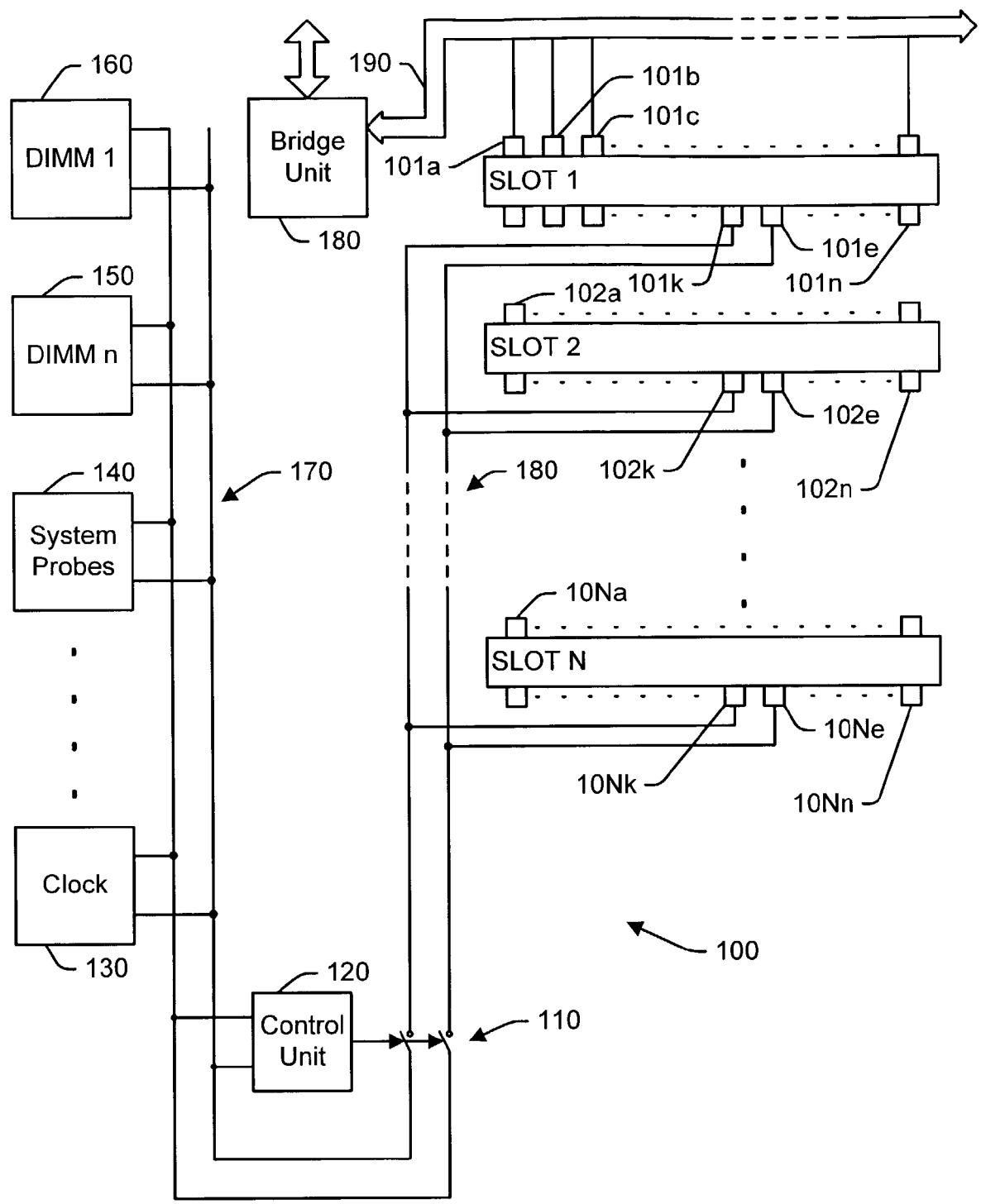
FIG. 1 is a block diagram of an exemplary embodiment according to the present invention.

Turning to the drawings, exemplary embodiments of the present application will now be described. FIG. 1 is a block diagram of a computer system 100 showing only the parts relevant to the present invention. Three slots of a slot based system with SLOT 1, SLOT 2, . . . SLOT N are shown in FIG. 1. The present invention takes advantage of the fact that modern slot based bus systems, such as, the commonly used PCI bus system do not use all the pins available in each slot or the fact that improved bus standards use pins which were not used in a previous or older bus standard. For example, the PCI 2.2 standard does not use pins 40 and 41 on the A-side connector. However, the newer standard PCI 2.3 which is downward compatible with PCI 2.2 uses these pins for a serial communication bus. Each slot in such a bus system has a plurality of contact pins. For example, SLOT 1 shows pins 101a, 101b, 101c, . . . 101n. All signal carrying pins are coupled with the PCI bus 190 as indicated in FIG. 1. For a better overview only the connection of some of the pins of the top row of SLOT 1 is depicted. As mentioned above, it is assumed that not every pin is used, such as in an older bus system, such as, a PCI 2.2 bus system. For example, pins 101k and 101l are not used in this embodiment. All signal pins are usually coupled with a bridge unit 180 to de-couple the bus 190 from the other motherboard components, such as the CPU and other devices 130–160. Thus, whenever the slot based bus system fails, for example, through a malfunctioning card, the rest of the computer system will still work because the slot based bus is de-coupled by means of the bridge unit 180.

In one embodiment, the present invention will use the previously unused pins for a secondary communication system using the SMBus (System Management Bus) of a personal computer system in a specific way. As mentioned above, the newer PCI 2.3 standard uses these pins for a SMBus communication bus. Therefore, in another embodiment, the present invention also applies to bus systems which use some control pins that are not de-coupled by a bridge unit. The System Management Bus is a two-wire interface through which simple power-related chips can communicate with the rest of the system. It uses $I^2C$ specifications. A system using the SMBus passes messages to and from devices instead of tripping individual control lines. With the SMBus, a device can provide manufacturer information, tell the system what its model/part number is, save its state for a suspend event, report different types of errors, accept control parameters, return its status, etc. It is desirable to connect this SMBus to each slot of the main extension bus system of a computer system. However, this bus will not be coupled with any bridge unit. For example, the two unused connection pins 101k, 101l; 102k, 102l; . . . 10Nk, and 10Nl of the PCI system as shown in FIG. 1 can be used for this purpose. A new generation of PCI cards can then be designed that can communicate via this SMBus in addition to the PCI bus with other cards or components on the motherboard. This frees the PCI bus from specific communication tasks which are not critical with respect to transfer speed for its main high speed applications. However, to accomplish this, the bus will not be coupled with any bridge unit but rather directly with the respective components/devices on the motherboard.

This additional functionality of the PCI bus has been described in the specification of the Revision 2.0 of the SMBus. The respective SMBus committee made some assumptions that it is safe to use these two previously unused pins. However, there are concerns that some older cards erroneously grounded one or both of these pins or possibly tied them high. If this is the case, the SMBus will not function anymore once such a card is inserted in one of the slots of the computer system. In such a case the system will also fail to boot and not even able to display an error message because the SMBus is needed for the memory detection and cannot be de-coupled through a bridge unit. Such a scenario is not unlikely as when a system is upgraded to a faster computer, usually some or all peripheral cards of the older system will be used in the new system.

According to the present invention a coupling/de-coupling unit 110 is introduced between the SMBus 170 and the bus lines 180 which are used for coupling to the unused pins 101$k$, 101$l$; 102$k$, 102$l$; . . . 10N$k$, and 10N$l$ of the PCI system. Coupling/de-coupling unit 110 can be a controllable switch, a controllable bi-directional driver or any other suitable coupling/decoupling means. A control unit 120 is provided which controls the switch 110 and which also connects to the SMBus 170. The control unit 120 comprises means to detect the status of the SMBus 170. For example, the control unit 120 can comprise a voltage or current detector. Furthermore, the control unit 120 can comprise logic to send a test signal via the SMBus 170 lines to determine whether a communication signal will be transferred correctly via the SMBus 170. The SMBus 170 is coupled with a plurality of devices, such as, memory modules 150, 160, system probes 140, a clock unit 130, etc.

Figure 3:
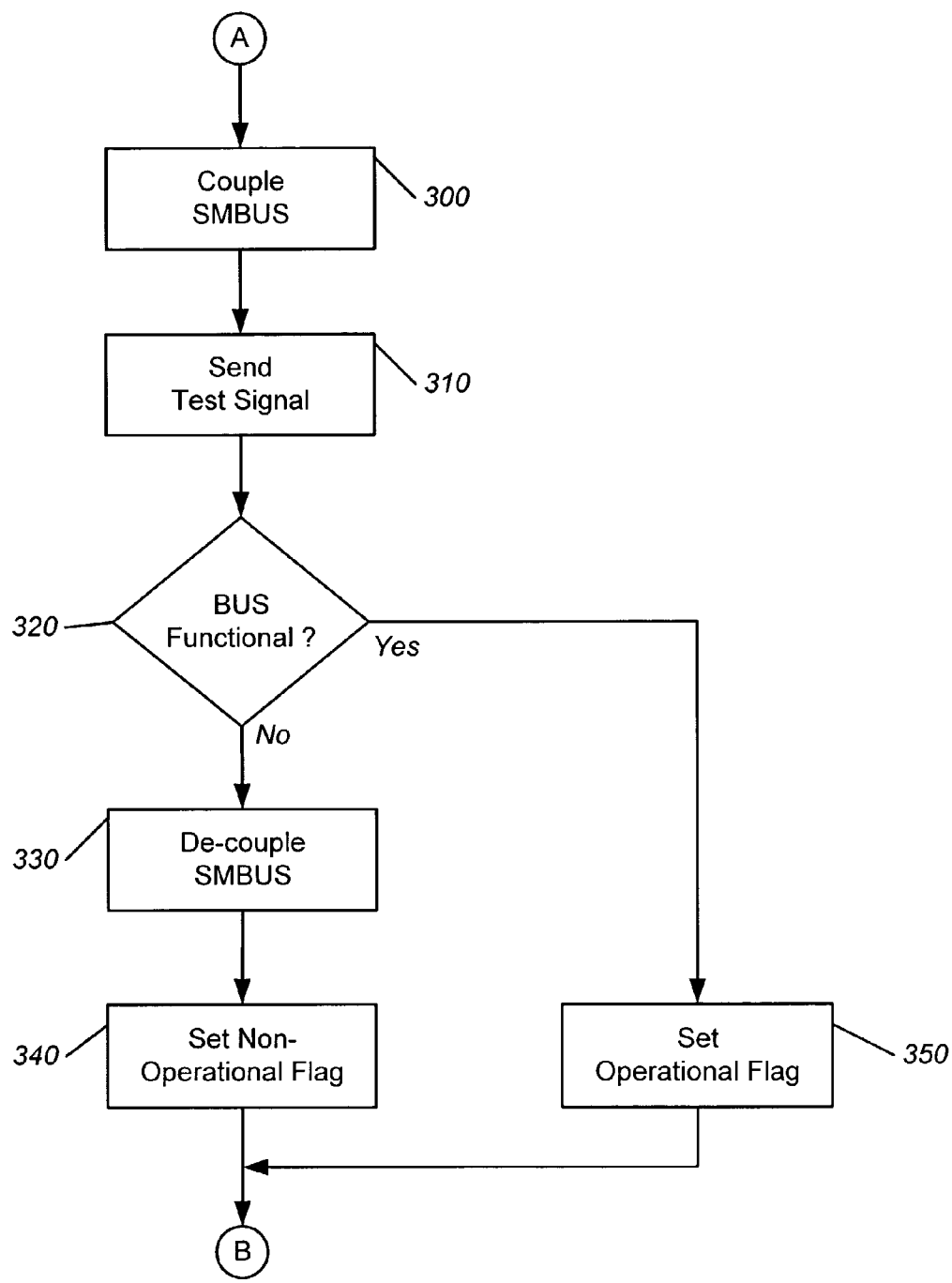
FIG. 3 is a flow chart showing a method according to the first embodiment shown in FIG. 1 of the present invention.

FIG. 3 shows a flow chart diagram for using the coupling/de-coupling unit according to the present invention. During initialization of the system, in step 300, control unit 120 couples SMBus 170 with connecting bus 180. Thus, SMBus 170 is now connected to the previously unused pins 101$k$, 101$l$; 102$k$, 102$l$; . . . 10N$k$, and 10N$l$ of the PCI system. In step 310, the system either sends a test signal and/or checks the status of the communication lines of the SMBus 170. In case one or more of the inserted cards erroneously coupled one or both previously unused pins 101$k$, 101$l$; 102$k$, 102$l$; . . . 10N$k$, and 10N$l$, control unit 120 will detect this condition in step 320. Thus, the BIOS will assume a problem and decouple SMBUS logic when a known SMBUS device fails to respond.

If the SMBus is functional, the system will set a respective operational flag in step 350 indicating that the system can use the SMBus for communication purposes with the PCI bus system. If the test fails, then control unit 120 will control switches 110 to de-couple the connecting bus 180 from the SMBus 170 in step 330 and set a respective non-operational flag in step 340 indicating that the SMBus cannot be used for communication with the PCI bus. This routine can preferably be implemented into the basic input output system (BIOS). Thus, a system even using non-compliant PCI cards will still function.

Figure 2:
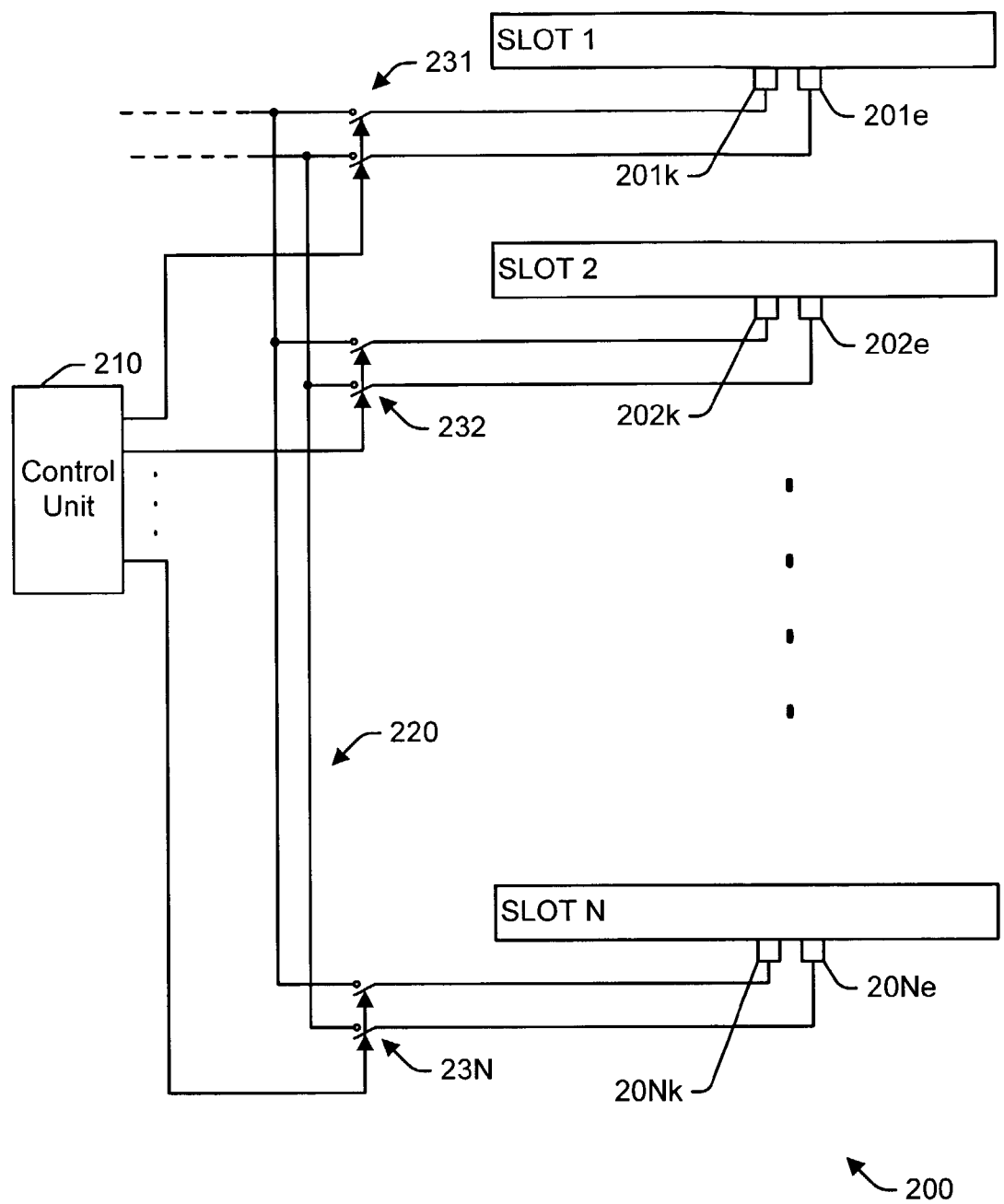
FIG. 2 is a block diagram of another exemplary embodiment according to the present invention.

FIG. 2 shows a second embodiment according to the present invention. In FIG. 2 only the previously unused pins 201$k$, 201$l$; 202$k$, 202$l$; . . . 20N$k$, 20N$l$ of the slots SLOT1, SLOT2, . . . SLOTN are shown. Instead of coupling all previously unused pins 201$k$, 201$l$; 202$k$, 202$l$; . . . 20N$k$, 20N$l$ to form a connection bus as shown in FIG. 1, each slot is individually connected to a coupling/de-coupling switch unit 231, 232, . . . 23N. These switches 231, 232, . . . 23N, thus, couple or de-couple each individual slot with the SMBus 220. Again, a control unit 210 is provided for individually control each switch 231, 232, . . . 23N.

Figure 4:
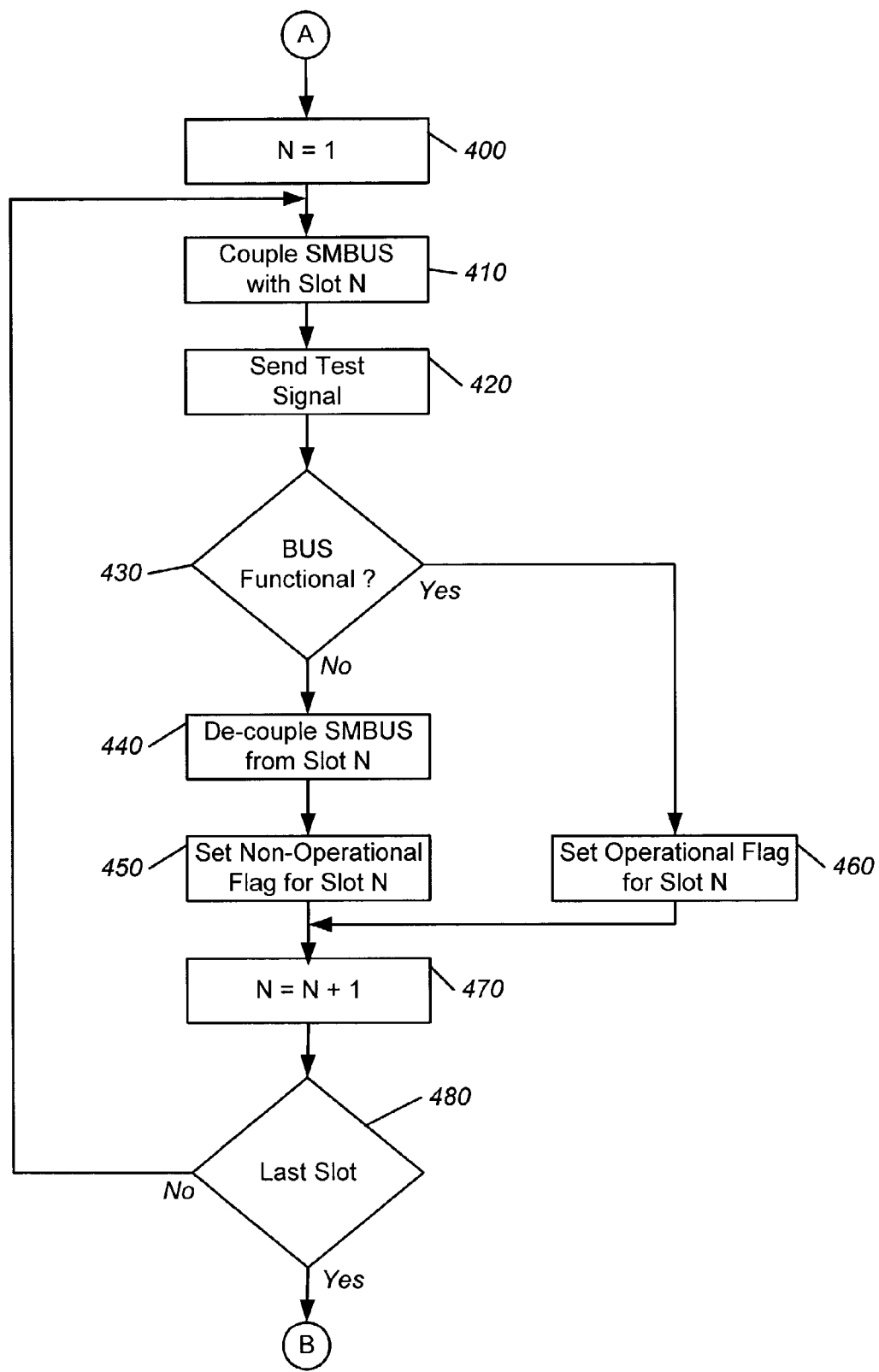
FIG. 4 is a flow chart showing a method according to the second embodiment shown in FIG. 2 of the present invention.

FIG. 4 shows a flow chart diagram with a respective exemplary routine that can be implemented into the BIOS of a computer system. In step 400 a index value is set to 1. In step 410, control unit 210 couples the previously unused pins 201$k$ and 201$l$ of SLOT1 with the SMBus 220. In step 420, the system either sends a test signal and/or checks the status of the communication lines of the SMBus 220. In case the PCI card inserted in SLOT1 erroneously coupled one or both previously unused pins 201$k$, 201$l$, control unit 210 will determine this condition in step 430. If the SMBus is functional, the system will set a respective operational flag in step 460 indicating that the system can use the SMBus for communication purposes with SLOT1 of the PCI bus system. If the test fails, then control unit 210 will control switches 231 to de-couple the previously unused pins 201$k$ and 201$l$ of SLOT1 from the SMBus 220 in step 440 and set a respective non-operational flag in step 450 indicating that the SMBus cannot be used for communication with SLOT1 of the PCI bus. In step 470 the index value N is incremented and in step 480 it will be determined whether all slots SLOT1, SLOT2, . . . SLOTN have been test. If yes, then the routine ends. If not, the system will repeat steps 410 to 480 for the remaining slots. Thus, each individual slot SLOT1, SLOT2, . . . SLOTN will be tested and if necessary disconnected from the internal SMBus. Therefore, only slots which are not compatible with the improved SMBus standard will be disconnected leaving all other slots operational for communication via the SMBus. Cards which comply with the new standard, therefore, can take advantage of the SMBus even if non-compliant cards are inserted into the system.

The present invention is not limited to PCI bus systems but can be used for any type of bus system in which a respective number of connection pins were previously unused. Such connection pins can be used in future improvements for all kinds of purposes. Therefore, the present invention is also not limited to the application of the SMBus. Other types of busses or communication or control links can be used with the present invention. For example, a single previously unused pin can be used according to the principles of the present invention. Such a single pin can be used to transfer data via a asymmetrical serial communication interface using a single transfer line in combination with a ground line. Other bus systems, control lines, or communication interfaces can include one or more control lines.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A bus architecture of a computer system, comprising:
a first bus;
a first slot coupled to the first bus, wherein the first slot has a plurality of pins and wherein at least one of the pins is unused;
a data bus selectively coupled between a device of the computer system and an unused pin of the first slot;
a control line for completing or breaking a connection between the device and the unused pin; and
a control unit coupled to the control line, wherein the control unit is operable to detect the status of the data bus and actuate the control line to complete or break the connection between the device and the unused pin of the first slot.

2. The bus architecture of a computer system of claim 1, wherein the first bus comprises a PCI bus.

3. The bus architecture of a computer system of claim 1, wherein the data bus comprises an SMBus.

4. The bus architecture of a computer system of claim 1, wherein the control unit comprises a sensor for detecting the status of the data bus.

5. The bus architecture of a computer system of claim 1, wherein the device comprises memory and the data bus is coupled between memory and the unused pin of the first slot.

6. The bus architecture of a computer system of claim 1,
wherein the first bus is the PCI bus;
wherein the data bus comprises an SMBus;
wherein the control unit includes a sensor for detecting the status of the data bus; and
wherein the device comprises memory and the data bus is coupled between memory and the unused pin of the first slot.

7. A method for managing the unused pins of a bus of a computer system, comprising:
providing a first bus;
providing a first slot that is coupled to the first bus, wherein the first slot has a plurality of pins and wherein at least one of the pins is unused;
providing a data bus selectively coupled between a device of the computer system and an unused pin of the first slot;
a control line for completing or breaking a connection between the device and the unused pin; and
providing a control unit coupled to the control line, wherein the control unit detects the status of the data bus and actuates the control line to complete or break the connection between the device and the unused pin of the first slot.

8. The method for managing the unused pins of a bus of a computer system of claim 7, wherein the first bus comprises a PCI bus.

9. The method for managing the unused pins of a bus of a computer system of claim 7, wherein the data bus comprises an SMBus.

10. The method for managing the unused pins of a bus of a computer system of claim 7, wherein the device comprises memory and the data bus is coupled between memory and the unused pin of the first slot.

11. The method for managing the unused pins of a bus of a computer system of claim 7,
wherein the first bus is the PCI bus;
wherein the data bus comprises an SMBus; and
wherein the device comprises memory and the data bus is coupled between memory and the unused pin of the first slot.

* * * * *